United States Patent

Burress et al.

[15] 3,679,741
[45] July 25, 1972

[54] PURIFYING AND MILLING TEREPHTHALIC ACID

[72] Inventors: George T. Burress, Beaumont; James L. Willis, Jr., Beauxart Gardens, both of Tex.

[73] Assignee: Mobil Oil Corporation

[22] Filed: July 23, 1970

[21] Appl. No.: 57,779

[52] U.S. Cl. .................................................260/525
[51] Int. Cl. .................................................C07c 51/42
[58] Field of Search.................................260/525

[56] References Cited

UNITED STATES PATENTS

| | | | |
|---|---|---|---|
| 3,522,298 | 7/1970 | Bryant et al. | 260/525 |
| 3,526,658 | 9/1970 | Bryant | 260/525 |

FOREIGN PATENTS OR APPLICATIONS

| | | | |
|---|---|---|---|
| 1,107,213 | 5/1961 | Germany | 260/525 |
| 572,092 | 4/1959 | Belgium | 260/525 |

OTHER PUBLICATIONS

Axelson et al, Chapter III in " Laboratory Engineering," Weissberger, ed., 1957, pages 183– 6, 190– 3 & 198– 9.

*Primary Examiner*—Lorraine A. Weinberger
*Assistant Examiner*—R. S. Weissberg
*Attorney*—Oswald G. Hayes, Andrew L. Gaboriault and James F. Snowden

[57] ABSTRACT

Impure terephthalic acid contaminated with intermediate products of the oxidation of p-xylene is processed into a state suitable for easy direct esterification with glycol by a combination of contact of the crude acid at 600°–750°F. in the vapor state with a Group VIII metal catalyst (e.g., Pt or Pd on carbon) and condensation of the purified acid from the treated vapor together with subsequent disintegration of the resulting predominantly rough aggregate particles of condensate by a high intensity wet or dry milling without metal-to-metal contact (e.g., high impact milling) to produce mainly discrete smooth particles of high purity and excellent dry flow and glycol slurrying characteristics; optionally, the condensed aggregate particles may also be leached in a solvent (e.g., water) at elevated temperatures and recrystallized prior to milling to further enhance both handling properties and purity.

9 Claims, No Drawings

PURIFYING AND MILLING TEREPHTHALIC ACID

BACKGROUND OF THE INVENTION

1. Field of the Invention

The present invention is concerned with the production of terephthalic acid of extremely high purity and good slurrying and handling characteristics from terephthalic acid containing impurities, including an aldehyde.

2. Prior Art

Terephthalic acid is a substance of increasing commercial importance as exemplified by its use in large quantities in the production of fiber and film-forming polyesters, such as polyethylene terephthalate of high molecular weight. For many purposes, including its use in textile fibers and magnetic tape bases, an extremely high degree of purity is necessary in such polyesters to obtain the desired color, dyeing characteristics and/or excellent physical and electrical properties. Heretofore, most commercial production of such pure polyesters has involved an indirect route of converting the acid to its dimethyl ester and purifying the ester by recrystallization or distillation prior to transesterification with a glycol, such as ethylene glycol, and polymerization. More recently, it has been found advantageous to directly esterify terephthalic acid of high purity with the glycol; hence efficient and economical methods for the purification of terephthalic acid are now of prime importance.

Terephthalic acid can be manufactured by several processes known in the art, as exemplified by the catalytic oxidation of para-xylene according to the processes described in U.S. Pat. Nos. 2,833,816, 2,853,514, 3,036,122 and others.

The major impurities present in terephthalic acid prepared by the catalytic oxidation of p-xylene result from incomplete oxidation; and the crude product generally contains about 0.5 to 3 percent of para-carboxybenzaldehyde as well as other intermediate oxidation by-products, such as para-toluic acid. Leaching of this crude product with hot acetic acid or another suitable agent may be employed to reduce the content of such impurities and provide a leached crude material typically containing about 0.2 to 1.5 percent p-carboxybenzaldehyde. Also a much smaller amount of ash is typically present in the form of one or more metal compounds derived from the residue of a metal salt oxidation catalyst (e.g., cobalt acetate catalyst) and/or the corrosion of process equipment, silica and organic decomposition products. A particularly troublesome by-product of p-xylene oxidation is p-carboxybenzaldehyde which acts as a chain stopper during subsequent polyesterification of the terephthalic acid and, either alone or in combination with other intermediate oxidation products, imparts undesirable coloration to the resulting polyester product. Moreover, it is difficult to remove this aldehyde compound from terephthalic acid by conventional techniques, particularly to the extent of meeting commercial specifications for a maximum p-carboxybenzaldehyde content of 25 or 50 parts per million (ppm.) by weight.

Various procedures have been proposed for the purification of terephthalic acid including fractional recrystallization and leaching as well as sublimation with various types of condensation, but all of these methods have their limitations either as to effectiveness or the operating difficulties encountered therewith. More recently, far better results have been obtained in a treatment of vaporized crude terephthalic acid in the presence of hydrogen and a catalyst, such as platinum or palladium supported on carbon particles, in either a fixed bed or as finely divided solid particles suspended in the acid vapor. Although the chemistry involved in this treatment is not yet fully understood, there is some reason to believe that the p-carboxybenzaldehyde eliminated during the process may be converted into benzoic acid. The latter substance is a far less objectionable impurity as it can be removed more easily, for example, by being taken off in the vapor state while the purified terephthalic acid is being fractionally condensed from the vapor stream as solid particles.

While a highly purified product is readily and consistently obtained in this catalytic treatment, the solid terephthalic acid condensed from the treated vapor has a number of unfortunate characteristics for the dry powder displays undesirable pouring and flow qualities in hoppers and chutes as well as poor wetting characteristics, and it does not mix well with glycol in preparation for esterification. The latter characteristic is particularly pronounced when the terephthalic acid condensate is mixed with a relatively low ratio of ethylene glycol as is generally desirable to minimize forming side products in producing bis(hydroxyethyl) terephthalate. The instant process is based on a discovery for minimizing or eliminating such undesirable product characteristics.

Summary of the Invention

Accordingly, the present invention is directed at a process for the production of terephthalic acid of high purity and good handling and physical properties by a combination of steps which include, vaporizing terephthalic acid contaminated with impurities including an aldehyde, subjecting the resulting vapor to contact with a solid agent containing a Group VIII metal, cooling the treated vapor to condense the terephthalic acid as solid particles having a substantially lower content of said aldehyde whereby the terephthalic acid condensate comprises a major proportion by weight of aggregate particles; thereafter subjecting the aggregate particles to high intensity milling in the absence of metal-to-metal contact and of sufficient intensity and duration to break down the structure of aggregate particles and convert at least a major weight proportion thereof into discrete particles of terephthalic acid.

Other aspects of the invention include one or more of such features as wet milling, dry milling, maintaining the particles at a temperature below their tackiness level (e.g., below about 400° F.) during milling, and wherein an intermediate solution recrystallization operation is incorporated between the catalytic purification and the milling steps.

DESCRIPTION OF SCIENTIFIC EMBODIMENTS OF THE INVENTION

The process of this invention may be used for purifying terephthalic acid prepared by any method. It is especially suitable for the purification of aldehyde-containing crude terephthalic acid obtained by the liquid phase, catalytic oxidation of p-xylene with molecular oxygen as illustrated by processes of the type described in the three oxidation patents mentioned earlier and other methods. Typical processes utilize air or oxygen as the oxidant, a cobalt-containing catalyst alone or in combination with a co-catalyst, such as a zirconium compound, and usually a reaction activator in the form of a methylenic ketone (e.g., methyl ethyl ketone) or a bromine-containing substance. Prior to the purification treatment of this invention, it is generally desirable to subject the crude oxidation products to a preliminary leaching in acetic acid or another of the solvents mentioned hereinafter at elevated temperature in order to reduce the content of impurities and consequently the amount of contact agent required for the subsequent purification according to the present invention.

The instant process is a combination process involving contact of the impure terephthalic acid in the vapor state with a catalytic agent and condensation into solid form together with a subsequent intensive milling procedure to provide highly purified terephthalic acid of greatly improved handling, wetting and slurrying characteristics; optionally an intermediate solution-recrystallization operation in water or another suitable solvent may be incorporated in the process.

In preferred embodiments, the vapor phase treatment may utilize any method of vaporizing the terephthalic acid to be treated. The process disclosed in Bryant application Ser. No. 736,925 filed on May 27, 1968, and now U.S. Pat. No. 3,526,658, is particularly suitable, and that disclosure is incorporated herein by reference. In that method, crude terephthalic acid powder in nontacky condition is charged into a stream of inert carrier gas flowing at a velocity sufficient to entrain and suspend the particles of terephthalic acid (i.e., transport velocity) while they are being vaporized by passing through a heated vaporizer coil. The inert carrier gas may be charged in a mol ratio of about 5:1 to 150:1 or more based on the terephthalic acid. While nitrogen or other gases inert to terephthalic acid may be utilized, steam or a mixture containing a substantial amount of it (i.e., 30 mol percent or more) is preferred, not only for economy, but, more importantly, because of the tendency of steam to inhibit anhydride formation in the terephthalic acid at elevated temperatures.

The impure terephthalic acid with its associated volatilizable impurities, including p-carboxybenzaldehyde, is treated in the vapor state either alone, or preferably in admixture with the aforesaid carrier gas and desirably in the presence of hydrogen, by contact with a solid agent containing a Group VIII metal and subsequently condensed from the resulting vapor mixture as a purified terephthalic acid of substantially lower p-carboxybenzaldehyde content (e.g., at least about 98% less and typically with a content below about 50 ppm.) according to the method described in Bryant et al. application Serial No. 601,331, filed on Dec. 13, 1966, and now U.S. Pat. No. 3,522,298; and that disclosure is incorporated herein by reference.

Palladium and platinum are the preferred catalysts for the aforesaid vapor treating step of this invention; but other agents containing a metal of Group VIII of the Periodic Table of Elements and possessing activity for hydrogenation are suitable in general, and particularly in the presence of molecular hydrogen. The Group VIII metal may be present in a chemically combined form (e.g. an oxide, such as ruthenium oxide, or a sulfide such as nickel sulfide, etc.) but it is more desirably present in elemental form. In addition to Group VIII metals such as ruthenium, rhodium, palladium, osmium, iridium and platinum, other examples of suitable contact agents having hydrogenation activity include cobalt molybdate, nickel tungsten sulfide, and reduced nickel oxide. In most cases, the palladium metal or other active component of the contact material is advantageously disposed on a support. Carbonaceous materials (e.g. charcoal, powdered carbon, etc.) are preferred as the solid supports for the active component of the agent that is contacted by the vaporized terephthalic acid; however various other supports, such as alumina or silica-alumina, may be used. In typical composite agents, the active component may amount to from about 0.05 percent to about 10 percent of the total weight of the active component and support. Especially good results are realized with the use of a contact material containing from about 0.1 percent to 5 percent of platinum or palladium on a powdered carbon support.

In the process of this invention, the solid contact material may be located in a fixed bed for contact with the vapor mixture containing the crude terephthalic acid, or particles of the contact material can be dispersed in the vapor, for instance by either concurrent or countercurrent flow relative to the vapor stream. For such dispersions, the contact material can be added in the form of fine particles which may be of any size suitable for entrainment in the stream, and which preferably have an average diameter of not more than about 600 microns, in the case of concurrent flow, and larger particles may be more desirable to avoid entraining the particles in counterflow operations. Such catalyst particles can be added to the stream by any convenient method, for example, by means of suitable feeding devices for dry powder or as a slurry in a suitable liquid, such as water.

The contact material may be employed in any amount sufficient to effect the desired degree of purification. Substantial purification can usually be achieved with a feed ratio of up to 10,000 pounds or more of crude terephthalic acid per pound of contact agent, but the process is generally carried out with a feed ratio between 1,200 and 7,200 pounds of crude terephthalic acid per pound of contact material.

The presence of hydrogen in the vapor mixture during the catalytic purification operation is optional but usually desirable as it appears to maintain or prolong catalyst activity. In a preferred embodiment of the process, at least about 10 moles, and preferably between about 50 and 1,000 moles of hydrogen is charged per mole of carboxybenzaldehyde or other similar impurity present in the vaporized crude terephthalic acid. Desirably, the hydrogen is injected into the vapor stream prior to or simultaneously with the introduction of the contact agent.

The temperature of the catalytic purification treatment need not be higher than the minimum temperature required to vaporize the terephthalic acid. In general, this temperature is below about 1,000°F., and preferably between about 600° and 750°. The contact or residence time may be varied as desired over a wide range, for instance, for as long as a few minutes, but usually a fraction of a second up to abut 40 seconds, (e.g., about 0.1 to 5 seconds) is adequate.

Following contact between the vaporous mixture containing crude terephthalic acid and the contact solids, the resulting vaporous product is preferably filtered before it is condensed, especially when the contact agent is suspended in the vapor mixture or a significant amount of ash is entrained therein.

The treated and filtered vapor, which is usually at a temperature of about 700°F., is then cooled to a temperature suitable for condensing at least a substantial proportion, and preferably as much as possible, of the terephthalic acid from the vapor state into solid form. Although such cooling may be effected in indirect heat exchangers or vessels externally cooled by circulating air or water, it is greatly preferred to introduce one or more direct coolants into contact with the treated vapor in order to minimize or eliminate the deposition and adhesion of solid terephthalic acid on the walls of the equipment. The direct cooling medium may be either lower temperature steam, nitrogen or other inert gas, or a liquid medium, such as water, or the solvents mentioned hereinafter. Various types of condensation may be used including fractional condensation of the terephthalic acid in one or more stages, or essentially total condensation which may or may not include the more volatile impurities and the steam. Thus, all of the normally solid material in the vapor state, include the more volatile impurities and the steam. Thus, all of the normally solid material in the vapor state, including any remaining impurities and the accompanying steam, may be subjected to total condensation in liquid water or another solvent medium to form a slurry; or the terephthalic acid in the vapor mixture may be fractionally condensed in the dry state in one or several stages with the steam and volatile impurities, such as benzoic acid, remaining in the uncondensed vapor. Also, the terephthalic acid content of the vapor may be essentially totally condensed while the carrier steam and volatile impurities are withdrawn in uncondensed form; and this terephthalic acid condensate may be withdrawn as a slurry in a direct liquid coolant or as a dry powder by using steam and/or a restricted amount of liquid coolant for the condensation. When the product is taken off as a slurry, it may be desirable to filter out the terephthalic acid to eliminate the impurities dissolved in the filtrate prior to further processing as described hereinafter.

The product of the catalytic vapor phase treatment has a high degree of purity; but, regardless of the manner of condensation, whether fractional or total condensation, and of recovery in either dried or slurried form, it displays difficult handling and slurrying characteristics. For example, in transportation and processing operations, the power tends to cling to the sides of the chutes and vessels and also to "bridge" across hoppers when flowing through such equipment. Various expedients have been adopted to partially alleviate the flow and pouring difficulties, as exemplified by hammering on equipment or attaching vibratory devides thereto; however such expedients are, at best, a nuisance and often fail to produce a steady flow rate. The condensed material also displays poor wettability and slurrying characteristics. For instance, the powder floats on the surface of water, and little or none of it becomes wetted under the influence of intense agitation; hence special procedures are necessary for forming slurries in water. More importantly, the condensate also floats on the surface of ethylene glycol despite the lower surface tension of the glycol, and this hinders the preparation of the esterification reaction mixtures involved in the present predominant commercial utility of terephthalic acid. Very heavy viscous slurries are formed upon mixing the condensate powder into the glycol, and such slurries do not tend to become uniform dispersions either readily or rapidly. Accordingly, extra time is required for properly blending these materials and extra power must be provided for mixing and pumping the slurries.

While it was earlier thought that the aforesaid difficulties resulted from the relatively small particle size of the terephthalic acid condensate, it has now been discovered that most or all of the undesirable properties are due to the structure and contours of the individual particles, rather than their size. Electron micrographs reveal that the powder is composed of predominantly jagged and rough aggregate particles, each of which appears to be made up of numerous (often several dozen) minute component particles bonded together in various configurations, as exemplified by rough ball-shaped clusters and jagged chains extending in several directions. While the component particles appear to be fused to one another in an aggregate particle, it is possible that electrical forces play a significant role in bonding them together. Such aggregates may also be described as cemented agglomerate particles.

In the second stage or later in the present process, the particles of terephthalic acid condensed in the catalytic purification operation are subjected to high intensity milling for it has now been discovered that a physical reduction operation of this type produces a striking improvement in the dry flow, wetting and glycol slurrying characteristics of the terephthalic acid. Such milling is a disintegration process in which the structure of a substantial proportion of the rough aggregate particles in the feed are broken down by high velocity impacts and/or attrition into discrete particles of a rounded type (e.g., spheroidal and cylindrical particles) or into smaller aggregate particles that consist of fewer component particles and consequently have smoother contours.

Pulverizing and milling in the commoner types of apparatus will not accomplish such results with material having the many unusual characteristics of terephthalic acid. Although this compound is a truly sublimable solid which vaporized without liquefying when gradually heated to its sublimation temperature, it does become tacky and even loose particles tend to cohere when agglomerates at temperatures (e.g., about 400°F.) far below its vaporization point; and this tendency is aggravated by loading or compression of the powder for agglomeration or crusting of the material then occurs at lower temperatures of the order of 300°F. When terephthalic acid powder is ground between rolls pressing against one another with substantial force or by rolls rotating around and bearing against a stationary outer ring, such action tends to compress or compact the aggregate particles into larger agglomerates or compact the aggregate particles into larger agglomerates rather than to primarily break down the structure of the aggregate particles already existing, and the heat created in routine grinding and pulverizing operations increases this tendency toward agglomeration. In addition, such operations frequently involve metal-to-metal contact in the apparatus with consequent contamination of the product with fine particles of the metals or their oxides.

The intensive milling operation in the present process may be carried out with a wide variety of different types of apparatus wherein individual particles are subjected to high velocity impacts or attrition while in a state where the particle is free to move in one or more directions under the force of the impacts instead of being compressed against another apparatus element. Among the suitable types of apparatus are pin or rod mills, high speed blade-type blenders, high shear turbine and centrifugal pumps, high speed fluid jets impinging on one another or on a suitable surface. In such equipment the individual particles are struck with a high velocity impact by revolving blades, of either a sharp or dull type, or pins or rods mounted on a disc rotating at high speed or entrained in a high velocity jet of a gaseous or liquid medium that impinges upon a solid surface or another such jet. In several of these actions, the individual particle receives a heavy impact from a rapidly moving blade or pin and moves at high velocity outward to impinge on a casing or liner and thereby receive another heavy impact or the particle may rub against the side of apparatus elements in its high velocity travel. Moreover, a substantial degree of attrition or abrasion often occurs as the particle accelerated to high velocity by gaseous jets, etc., collides with other particles.

While the milling may be carried out with either a dry powder or with the terephthalic acid particles suspended in slurry form in water or another suitable liquid medium, for recirculation through devices, such as a conventional centrifugal pump, dry milling is usually preferred as the apparatus is generally operated at greater speeds and thus provides greater shattering effect by impacts of the moving mill elements against particles of the powder. Moreover, the dry milling operation is much briefer in many instances, and it does not require any subsequent filtering or centrifuging and drying steps for recovering the purified product. In some cases, as exemplified by the high impact milling of the dry powder by impactors moving at extremely high velocities, the aggregate particles in the condensate can be broken down to a sufficient extent in a single pass through the mill by suitable adjustment of the feed rate, particularly where the mill has a provision for internal recirculation of the powder; but in other cases it may be desirable to pass the milled powder through a number of mills of the same or other suitable type arranged in series. Alternatively, the milled powder may be recycled externally or returned to the mill inlet for one or more additional milling operations. Also, a partial recycle of a small or large proportion of the milled product to the mill inlet may be utilized in continuous milling operations. Such external recycling of the powder or slurry undergoing milling is more likely to be required in cases where the milling is of a less severe nature as in the case of a relatively small centrifugal pump.

In the three-stage embodiments of the present invention, the catalytic purification is followed by both a solution-recrystallization operation and then the aforesaid milling procedure. The intermediate operation is performed at elevated temperatures in a suitable solvent in the manner described in the concurrently filed Willis et al. application Ser. No. 57,778 which is incorporated herewith by reference. Both of these procedures produce a substantial reduction in the content of aggregate particles of terephthalic acid, usually a major reduction; but entirely different physical actions are involved, for disintegration or breaking down of the structure of the particles and attrition occur in milling, whereas the solution-recrystallization procedure reshapes or reconstitutes the particles by solution equilibrium into mainly discrete particles, often of larger size, and also purifies them by solvent action.

Among the many suitable solvents for leaching and recrystallization are water, acetic acid and other aliphatic monocarboxylic acids containing from two to eight carbon atoms (e.g., propionic, valeric and 2-ethyl hexanoic acids), ketones, xylenes, dioxane, tetrahydrofuran, N,N-dimethylformamide and N,N-dimethylacetamide. Water and acetic acid are the preferred solvents.

Although the terephthalic acid condensate may be completely dissolved in some embodiments of the process, it is generally preferable to effect only partial solution and thus provide a leaching action with equilibrium between solid and dissolved phases of the terephthalic acid in a saturated solution. The leaching or solution temperature depends on the type and quantity of the solvent employed and should be sufficiently elevated to dissolve at least about 5 percent of the terephthalic acid present, and the range of about 380°–580°F. is suitable for water and acetic acid. For recrystallization, any temperature low enough to precipitate substantially all of the dissolved terephthalic acid may be employed, but a relatively high temperature appears to provide superior results with at least some solvents. Preferably, this temperature is low enough to reduce the solubility of terephthalic acid below say 1 percent of the weight of the solvent. Again, the temperature here also is governed by the characteristics of the selected solvent. In the case of water and acetic acid, particularly good results are obtained with a recrystallization temperature in the range of about 285°–400°F. and this temperature is preferably also at least 50° below the leaching temperature. For cooling the leach slurry to the recrystallization temperature, it is often desirable to recycle either product slurry (i.e., material which has previously been recrystallized and then cooled further) or the filtrate thereof in order to provide direct cooling and thus avoid fouling heat exchanger surfaces. Leaching and recrystallization are usually performed under superatmospheric pressures to maintain the solvent in the liquid state at such elevated temperatures.

The leaching or solution step may be carried out in conventional manner with stirring in a heated closed vessel or while flowing through a coil in a furnace, and either batch or continuous operations may be employed. However, the continuous cyclic leaching technique described in Nasser application Ser. No. 805,187, filed on Mar. 3, 1969, which is also described in the examples hereinafter, provides a highly effective and uniform leaching action in a relatively short residence time. Briefly, that process consists of recirculating a confined slurry at leaching temperature and a high circulation rate around a closed piping loop provided with a heating zone in which the temperature of the circulating slurry is raised a few degrees and with a cooling zone in another location where the temperature of the slurry is reduced a corresponding amount; meanwhile feed slurry is continuously being introduced through an inlet connection at a relatively low rate and product slurry is being withdrawn from an outlet located at a distance for subsequent recrystallization. Thus the temperature of the slurry undergoing leaching is alternately raised about 2° to 10° and lowered the same amount in each circuit around the loop with a concomitant alternate increase and decrease in the amount of terephthalic acid in solution; and the slurry is subjected to between about 20 and 150 of such cycles during a residence time of about 3 to 30 minutes, and preferably between about 5 and 10 minutes. For other types of leaching, the residence time may range from about 1 minute to 3 hours, and relatively short leaching times are often preferred to preclude the growth of excessively large crystals during the leaching equilibrium.

Similarly, recrystallization can be performed in either a batch or continuous manner in conventional equipment, such as tanks equipped with agitating devices. Also, continuous cyclic recrystallization may be employed along the lines described for the cyclic leaching procedure. In this case, the mean temperature of the slurry in the loop is, of course, considerably lower (e.g., at least 50° lower) to effect recrystallization and the recirculating slurry is repeatedly heated about 0.2° to 20°F. (usually less than 5°) above the mean loop temperature and alternately cooled to the same extent in each circuit of the loop. It may be desirable in at least some instances to supply most or all the heat required for the heating zone of the loop by means of the much hotter feed derived from the leach system and to admit cold solvent or recycled product slurry to the cooling zone to effect the necessary cooling; alternatively, the necessary heating and cooling may be accomplished with indirect heat exchangers. In cyclic recrystallization, the number of cycles may range from about 10 to 150 or more during a residence time of from 5 to 25 minutes, or more typically about 10 to 15 minutes. For other types of recrystallization, the residence time may be indefinitely long if large crystals are not objectionable, but it is usually within the range of about 3 to 60 minutes.

The product of this combination process involving catalytic vapor phase purification and intensive milling displays excellent handling, wetting and mixing characteristics as well as a high degree of purity. When examined under an electron microscope, the product particles are found to be essentially of a discrete or unitary nature in contrast with the cemented or fused aggregates of the terephthalic acid condensed in the catalytic purification step. The milled particles generally have smooth and rounded contours (e.g., cylindrical and approximately spheroidal particles) in marked contrast to the rough or jagged bent chains and cluster aggregates of the condensate particles. The milled material may contain a small amount of aggregate particles, but most of these have smoother contours than the condensate derived from the vapor treatment; moreover the quantity seldom, if ever, exceeds about 20 percent of the total weight of the particles and is generally well below about 10 percent. Also aggregate particles can be practically eliminated in the milled material by means of longer or more severe milling operations; but milling to extreme fineness (e.g., an average particle size below 3 microns) is seldom, if ever desirable as it is likely to create undesired attractive forces between particles.

The milled powder flows and pours readily in the dry state, and it mixes easily with ethylene glycol, even in 1:1.5 molar ratios of terephthalic acid to glycol, so that only a moderate torque and short time are required to form uniform dispersions of moderate viscosity.

In view of the good flow and glycol slurrying characteristics exhibited by terephthalic acid which had been subjected to the catalytic vapor treatment and reconstituted by the leach-recrystallization treatment, it was surprising to find that high intensity milling of the reconstituted material enhanced those physical characteristics. This further improvement is attributed to milling breaking down the structure of the small proportion of aggregates which probably formed during recrystallization.

For a better understanding of the nature, objects and benefits of this invention, reference should be had to the following illustrative examples wherein all proportions are set forth in terms of weight, all temperatures are in degrees Fahrenheit and particle size determinations are made by the Coulter counter method (based on equivalent spherical diameters of the particles) unless otherwise stated.

EXAMPLE 1

Terephthalic acid is prepared in large scale equipment in a continuous process by the cobalt-catalyzed oxidation of p-xylene following, in general, the reaction conditions described in Ardis et al. U.S. Pat. No. 3,036,122. The oxidation product slurry is filtered to separate the crude solid terephthalic acid which is briefly washed with acetic acid on the filter and then leached in clean acetic acid containing about 4 percent water at a temperature of 450°F. to substantially reduce the foreign matter (principally intermediate oxidation products of p-xylene) in the terephthalic acid. After recrystallization at 325°F. and filtering off the acetic acid, the resulting leached crude terephthalic acid is typically found to contain 1 percent or 10,000 parts per million by weight (ppm.) of p-carboxybenzaldehyde, 7,500 ppm. of p-toluic acid, 140 ppm. of benzoic acid and about 300 ppm. of isophthalic acid.

This leached crude terephthalic acid is the charge for the combination treatment of catalytic purification in the vapor phase and subsequent milling in accordance with the present invention. The initial step of the instant procedure is carried out in the manner described in the aforesaid applications. The crude terephthalic acid (TPA) in particle form is introduced at ambient temperature by means of a star feeder into a charge line through which is flowing a mixture of carrier steam (15 mole/mole TPA) and hydrogen (2.0 standard cubic feet/lb. TPA) at a temperature of 700°F., and 0.11 lbs. of 5 percent palladium-on-carbon catalyst per mole of terephthalic acid is also injected and entrained in the carrier stream. The entrained suspension passes through a vaporizer coil in a furnace and is heated to a maximum temperature of 725°F. to vaporize the terephthalic acid; then the mixture enters a catalyst collection vessel containing beds of gravel and sand in which most of the entrained catalyst is deposited as described in Remsberg application Ser. No. 671,535, filed on Sept. 25, 1967, now U.S. Pat. No. 3,637,831 downstream dust filters are employed to remove all remaining fine solid particles of catalyst and ash from the steam-vapor mixture. Next, the vapor stream is cooled to a temperature of 440°F. by spraying water and steam into a unobstructed primary condensation chamber wherein most of the terephthalic acid vapor is condensed into dry solid form, and a similar secondary condenser separates much of the remaining terephthalic acid dry at 420°F. from the vapor effluent of the primary condenser.

The mixed products of these condensers is a white powder which usually contains from 30 to 50 ppm. of p-carboxybenzaldehyde, from 20 to 40 ppm. of p-toluic acid, from 150 to 200 ppm. of benzoic acid and the quantity of isophthalic acid is below practical analytical limits. This material exhibits a loose bulk density of 15 to 20 lbs. per cubic foot when simply poured into a graduated glass cylinder of 100 ml. capacity, and its packed bulk density ranges from 30 to 35 lbs. per cubic foot when the powder settles after the cylinder is placed for ten minutes upon a mechanically actuated tapping table operating at 300 cycles per minute. In general, packed density determinations are considered to be more reproducible and more significant than the loose density. Typically, this material has a particle size distribution as follows:

| Particle Size — Microns | Sample Weight — % Of Smaller Size |
| --- | --- |
| 44 | 100 |
| 34.9 | 99.7 |
| 27.7 | 98.5 |
| 22.0 | 95.0 |
| 17.5 | 82.9 |
| 13.9 | 53.9 |
| 11.0 | 26.1 |
| 8.7 | 11.6 |
| 6.9 | 6.3 |
| 5.5 | 4.2 |
| 4.4 | 3.3 |
| 3.5 | 1.5 |
| 2.2 | 0.0 |

From these data, it can be calculated that the 10–90 weight percent cumulative particle size range is from 8 to 20 microns (i.e. 10 percent of the material is smaller than 8 microns and 10 percent larger than 20 microns) and also that the cumulative 50 percent particle size or median particle size by weight is about 13 microns. Upon plotting a particle size distribution curve of a sample with weight percentages as the ordinates and particle sizes as abscissae, it is found the the peak of the curve or "peak particle size" is at 13 microns.

This powder product of the vapor purification treatment is found to be difficult to handle in both dry and wet processing operations, for it exhibits the poor pouring, dry flow, wetting and slurrying characteristics described earlier. For example, typical samples of the material are found to have Brabender torques considerably greater than 700 gram-meters after 10 minutes of mixing in ethylene glycol and slurry viscosities of 160 units are obtained when the powder is subjected to the Krebs test. Theses values are indicative of extremely viscous slurries having poor blending properties and requiring excessive amounts of power in mixing.

In the second stage of the instant process, a half pint dry sample of the aforesaid condensed terephthalic acid is subjected to high impact milling in a laboratory Waring blender Model No. DL–202 in a brief batch operation at high speed with the blender operating at 20,000 revolutions per minute (rpm.) for a period of only 60 seconds. Certain physical characteristics of the powder before and after milling are evaluated with the following results.

| Characteristics | Before milling | After milling |
| --- | --- | --- |
| Bulk Density-lb./cu.ft. | | |
| Loose | 16 | 29 |
| Packed | 37 | 53 |
| Brabender Torque, gm-meters | 1000+ | 230 |
| Particle size-weight % and microns | | |
| Coarse-over 27.7 microns | 9.0% | 2.5% |
| Approx. median | 15.7 microns | 9 microns |
| Fines—under 4.4 microns | 1.5% | 10.2% |
| Pouring and dry flow | poor | good |
| Wettability | poor | excellent |

It is estimated that prior to milling, the powder contains more than about 80 percent by weight of aggregate or fused particles and that the milled powder has a content of less than about 10 percent of such particles.

EXAMPLE 2

Example 1 is repeated with another sample of terephthalic acid condensed from the vapor phase purification step and milling again at 20,000 rpm. for 60 seconds. Similar results are obtained in that most of the rough aggregate particles are broken into relatively smooth discrete or unitary particles. While the peak particle distribution size is reduced from 11 to 8 microns, this treatment greatly improves the handling and slurrying characteristics of the powder inasmuch as the packed density is increased from 36 to 52 lbs. per cubic ft. and the Brabender mixing torque is reduced from an excessive value of more than 700 gram-meters to an acceptable 220.

EXAMPLE 3

A large quantity of purified terephthalic acid condensate having the physical characteristics described in Example 1 is prepared in the same manner except for substituting a 1 percent platinum-on-carbon catalyst and charging it at a rate of 0.04 lbs. per mole of crude terephthalic acid in lieu of the palladium catalyst. This material is subjected to high intensity milling in an Entoleter Series 27 "CentriMil" operating at 4,500 rpm. and a no load rating of 30 and a load rating of 60 horse power. In this operation, the powder is fed at a rate of 3,300 lbs. per hour onto the sloping hub of the horizontal rotor and moves outward on the smooth rapidly spinning rotor disc under centrifugal force until the particles are struck by the vertical impactor rods aligned in two circular rows near the circumference of the disc. Such impact accelerates the powdered material to the full tip speed of the rotor which has a diameter of approximately 27 inches and the material is hurled outward against the smooth liner surrounding the rotor to complete the single pass operation.

The bulk temperature of the exiting powder is held below about 250°F. primarily by adjusting the feed rate in order to avoid developing tackiness in the powder which tends to appear at particle surface temperatures above 400°F.

The product of this dry high impact milling operation has an overall particle size range from about 3 to less than 44 microns with 7.5 percent by weight of particles larger than 17.5 microns, 9.5 percent smaller than 5.5 microns and a median particle size of about 9 microns. The loose density of the milled material is 26 and the packed density is 49 pounds per cubic foot, and this product displays very good dry flow characteristics despite its fineness. The intensive milling changes the powder from predominantly aggregate particles to predominantly smooth discrete particles, and the product blends and mixes well with ethylene glycol as evidenced by a reduction in its slurry viscosity from an excessive level of about 160 Krebs units to 82.

EXAMPLE 4

To illustrate the 3-stage purification and particle restructuring procedure of this invention, terephthalic acid vapor is subjected to catalytic purification and the resulting powder condensate is en subjected to a leach-recrystallization treatment in water according to the aforesaid Willis et al. application to substantially reduce its content of aggregate particles and subsequently the dry, leached material is subjected to high intensity milling to further reduce its aggregate particle content.

In this process, 20 parts of the solid condensate from the vapor treatment described in instant Example 1 is leached in 80 parts by weight of water for 6 minutes while the slurry is flowing through a 210-foot long coil of ⅜ inch titanium tubing which is submerged in a bath of liquid heating medium maintained at 450°F; then the terephthalic acid is recrystallized at a temperature of 320°F. for 25 minutes in a stirred pressure vessel, and filtered and dried. The recrystallized material contains only 16 ppm. of p-carboxybenzaldehyde and contents of benzoic, p-toluic and isophthalic acids below the minimum detectable limits; and its proportion of aggregate particles is estimated to be about 10 to 20 percent by weight. The physical characteristics of this material are measured before and after milling a one-half pint batch in the Waring blender at 20,000 rpm. for 6 seconds and tabulated hereinafter.

| Characteristics | Leached Terephthalic Acid | |
|---|---|---|
| | Unmilled | Milled |
| Slurry Viscosity—Krebs | 67 | 55 |
| Bulk Density—lb./cu.ft. | | |
| Loose | 32 | 41 |
| Packed | 49 | 64 |
| Particle Size—microns & weight % | | |
| Median | about 30 | about 19 |
| Minimum | 3.5–4.4 | 3.5–4.4 |
| Maximum | 105–210 | 44–74 |
| Fines—under 8.7 microns | 1.2% | 9.5% |
| Coarse—over 44 microns | 17.1% | 6.0% |

It will be noted that the milling treatment improves the handling characteristics by substantially increasing the packed density and also further improves its slurrying characteristics by still another substantial reduction in the slurry viscosity. These factors confirm the further reduction in the aggregate particle content of the milled and leached material which is estimated at well below 10 percent by weight.

EXAMPLES 5–8

Other embodiments of the 3-stage process of the present invention are demonstrated in these four examples wherein leached crude terephthalic acid is purified in the vapor phase and condensed as set forth in Example 1, except that 1 percent platinum-on-carbon particles are charged at a rate of 0.04 lb./mole TPA as the purification contact agent; then the condensed acid is subjected to several variations of the continuous cyclic leaching in hot water and recrystallization described in the aforesaid application Ser. No. 805,187 (now U.S. Patent 3,660,478); and finally one-pint samples of the dry recrystallized products are subjected to high impact milling in the Waring blender operating at 20,000 rpm. for a period of 6 seconds. The intermediate leaching operation is carried out in a continuous and cyclic manner by charging a steady stream of an aqueous slurry containing 20 percent by weight of terephthalic acid at 70°F. as the feed to a closed piping loop wherein the leach slurry is continually circulating at a mean leaching temperature of 450°F. repeatedly through a circulating pump, a heating zone and a cooling zone. In each pass or circuit around this leaching loop, the temperature of the recirculating slurry is raised a small but constant amount in passing through a heat exchanger and the heated slurry is cooled through the same small temperature differential by direct heat exchange upon admixture with the colder incoming feed slurry, meanwhile the leached product slurry is continually being withdrawn from an outlet connection on the opposite side from the inlet connection in the loop at a weight rate corresponding to the charging rate. In the instant examples, the residence times range from 5.4 to 9.6 minutes and the recirculation rate is held constant to thereby provide from 66 to 117 heating-cooling cycles through constant temperature differentials ranging from 3.20° to 5.64°F. in the several examples. The leached slurry is recrystallized at 350°F. in all cases in a continuous recrystallization operation in which the leached slurry is stirred in a closed vessel and cooled therein to 350°F. by the continual admission of recycled cold product slurry recrystallized previously. A stream of recrystallized slurry is withdrawn at a steady rate as the product which is subsequently filtered and dried at 300°F. for the milling operation; and the recrystallization residence time in the several instant examples ranges from 12.6 to 22.3 minutes. Data on the characteristics of the dry recrystallized terephthalic acid determined both prior to the high intensity milling operation and afterward are set forth in the following table.

| | Before Milling | | | After Milling | | |
|---|---|---|---|---|---|---|
| Ex. | Content PCB -ppm | *density, loose | lb/ft³ packed | Krebs Slurry Viscosity | density, loose | lb/ft³ packed | Krebs Slurry Viscosity |
| 5 | 23 | 39 | 50 | 58 | 45 | 63 | 55 |
| 6 | 21 | 33 | 47 | 76 | 45 | 62 | 55 |
| 7 | 14 | 38 | 50 | — | 45 | 66 | 57 |
| 8 | 24 | 33 | 45 | 80 | 43 | 61 | 57 |

*After the leach-recrystallization treatment, the contents of benzoic, p-toluic and isophthalic acids in all samples are below the minimum detectable limits.

Although the terephthalic acid particles reconstituted by leaching and recrystallization exhibit greatly improved powder flow characteristics and slurrying properties in the unmilled state, it is apparent from these comparative data that the milling operation produces a substantial further improvement in both of these qualities. These results are surprising inasmuch as the leach-recrystallization treatment reconstitutes a major proportion of the jagged or rough aggregate particles in the terephthalic acid condensate into discrete particles, and the relatively few aggregate particles remaining have considerably smoother surfaces; however microscopic examination confirms that the high impact milling operation results in a further substantial reduction in the weight content of aggregate particles.

EXAMPLE 9

The procedure of Examples 5–8 is employed in preparing a 50 lb. sample of catalytically purified, leached and recrystallized terephthalic acid for an intensive wet milling operation instead of milling the material in the dry state as in the previous examples. This material is slurried in 200 lbs. of water at 180°F. (a temperature level at which its solubility is essentially nil for practical purposes) in forming a 20 percent slurry which is milled by repeated circulation through a Goulds No. 3199 centrifugal pump with a 4.5 inch diameter impeller operating at 3,500 rpm. and driven by a one horse power electric motor. In this operation, the slurry is withdrawn from the bottom of the slurry tank into the pump suction line and returned to the top of the slurry tank through a pipe connected to the pump outlet. After determining the pump output capacity and operating the pump for a period sufficient to circulate the entire slurry therethrough 110 times, the slurry is withdrawn from the tank and filtered; then the filter cake is dried. The physical characteristics of the terephthalic acid before and after this treatment are set forth in the accompanying table.

| Characteristics | Leached Terephthalic Acid | |
|---|---|---|
| | Unmilled | Wet Milled |
| Slurry Viscosity—Krebs | 64 | 55 |
| Bulk Density—lb./cu.ft. | | |
| Loose | 35 | 36 |
| Packed | 48 | 54 |
| Particle Size—microns | | |
| Median | 45–50 | about 29 |
| Minimum | 6.9–8.7 | 2.2–3.5 |
| Maximum | 250–297 | 105–250 |
| Fines—under 11 microns | 0.3% | 10.3% |
| Coarse—over 74 microns | 19.8% | 2.4% |

These data indicate that a substantial improvement in the handling characteristics, especially in regard to the increase in packed density and decrease in slurry viscosity, are obtainable in the wet milling procedure. The slurrying characteristics are excellent. While the increase in bulk densities is not as much as in the case of dry milling, it is thought that higher impact milling in a pump operating at a higher speed or provided with an impeller of greater diameter will result in further increases in bulk densities of the terephthalic acid.

EXAMPLE 10

The procedure of Example 9 is repeated in a lengthy run wherein another sample of the terephthalic acid is subjected to wet milling in the same pump with the slurry maintained at 100°F. Samples are taken periodically and the terephthalic acid recovered and dried for measurement of the loose and packed bulk densities with the following results:

| Cumulative Time, hrs. | Densities—lbs/ft³ Loose | Packed | Average Number of Cycles |
|---|---|---|---|
| 0 | 34.0 | 46.6 | 0 |
| 8.5 | 41.9 | 53.7 | 34 |
| 13.5 | 44.6 | 55.7 | 54 |
| 20.5 | 47.2 | 57.6 | 82 |
| 26.5 | 48.0 | 57.8 | 106 |
| 32.5 | 46.8 | 57.1 | 130 |
| 36.5 | 47.8 | 59.7 | 146 |

These data demonstrate that substantial improvement in the packed density with a corresponding improvement in the flow characteristics of the terephthalic acid powder is obtainable with several dozen circulation cycles through the pump and that only minor improvements in these factors can be obtained at this temperature by longer wet milling. In fact, no improvement in those respects is observed after about 150 pump circulation cycles.

While the present invention has been illustrated by means of specific examples employing only a few types of milling devices and a single medium for wet milling operations in order to obtain data that provide valid comparisons, it will be readily apparent to those skilled in the art that the present process can be carried out with many other devices and other liquid media suitable for high intensity milling within the purview of this invention. Accordingly, the present invention should not be regarded as restricted in any particulars except as set forth in the appended claims or required by the prior art.

We claim:

1. A process for the preparation of highly purified terephthalic acid particles having improved glycol slurrying and dry flow properties which comprises vaporizing terephthalic acid contaminated with impurities including an aldehyde, subjecting the resulting vapor to contact with a solid material containing a Group VIII metal possessing hydrogenation activity, cooling the treated vapor to condense the terephthalic acid as solid particles having a substantially lower content of said aldehyde whereby the terephthalic acid condensate comprises a major proportion by weight of jagged and rough aggregate particles; thereafter subjecting said aggregate particles at a temperature below about 400°F. to high intensity milling in the absence of metal-to-metal contact and of sufficient intensity and duration to break down the structure of aggregate particles and convert at least a major proportion thereof into discrete particles of terephthalic acid having smoother contours than said aggregate particles and of improved glycol slurrying characteristics.

2. A process according to claim 1 in which dry condensate particles are subjected to said milling.

3. A process according to claim 1 in which a slurry of terephthalic acid particles suspended in a liquid medium is subjected to said milling.

4. A process according to claim 3 in which said liquid medium comprises at least a substantial proportion of water.

5. A process according to claim 1 in which the contours of said particles are smoothed by attrition while suspended in a liquid medium.

6. A process according to claim 1 in which a substantial portion of said aggregate particles of condensate are shattered by high velocity impacts during said milling to thereby produce particles having smoother contours.

7. A process according to claim 1 in which said condensate particles are reconstituted by at least partial solution in a solvent at a temperature sufficiently elevated to dissolve at least 5 percent of the terephthalic acid and subsequent recrystallization to convert a substantial portion of aggregate particles into discrete particles and said reconstituted particles are thereafter subjected to said milling operation.

8. A process according to claim 7 in which said condensate particles are reconstituted by leaching in partial solution in said solvent.

9. A process according to claim 7 in which said condensate particles are reconstituted by leaching in partial solution in water at a temperature between about 380° and 580°F.

* * * * *